(12) United States Patent
Chen et al.

(10) Patent No.: US 8,737,782 B2
(45) Date of Patent: May 27, 2014

(54) DYNAMIC OPTICAL CIRCULATOR DEVICE

(71) Applicant: Browave Corporation, Hsinchu (TW)

(72) Inventors: Yeongher Chen, Hsinchu (TW);
HsiangHsi Chiang, Hsinchu (TW);
HsienSheng Lin, Hsinchu (TW)

(73) Assignee: Browave Corporation, Hsinchu (TW)

( * ) Notice: Subject to any disclaimer, the term of this patent is extended or adjusted under 35 U.S.C. 154(b) by 64 days.

(21) Appl. No.: 13/624,735

(22) Filed: Sep. 21, 2012

(65) Prior Publication Data

US 2014/0086547 A1    Mar. 27, 2014

(51) Int. Cl.
*G02B 6/26* (2006.01)
*G02B 6/38* (2006.01)

(52) U.S. Cl.
USPC ............... 385/44; 385/41; 385/42; 385/60; 385/72; 385/78

(58) Field of Classification Search
CPC .................................... G02B 6/36; G02B 6/38
USPC .............................. 385/41, 42, 44, 60, 72, 78
See application file for complete search history.

(56) References Cited

U.S. PATENT DOCUMENTS

| 6,067,396 | A | * | 5/2000 | Heitmann | 385/139 |
| 7,031,574 | B2 | * | 4/2006 | Huang et al. | 385/39 |
| 2007/0196053 | A1 | * | 8/2007 | Kewitsch | 385/74 |
| 2011/0091164 | A1 | * | 4/2011 | Leonard et al. | 385/77 |
| 2013/0266279 | A1 | * | 10/2013 | Nishioka et al. | 385/99 |

* cited by examiner

*Primary Examiner* — Charlie Peng

(57) ABSTRACT

A dynamic optical circulator device applicable to UPC-type and PC-type optical connectors is provided, including a first UPC/PC-type optical connector, a second UPC/PC-type optical connector, a third UPC/PC-type optical connector, a passive optical circulator, a reflected light detector and a transform element. The first, second and third UPC/PC-type optical connectors provide connections to optical fibers for receiving and transmitting optical signals. The first UPC/PC-type optical connector, the second UPC/PC-type optical connector and the third UPC/PC-type optical connector are connected to the three ports of the passive optical circulator, respectively, with the reflected light detector placed between the second UPC/PC-type optical connector and the second port of the passive optical circulator, while the transform element can be placed between any port of passive optical circulator and corresponding UPC-type and PC-type optical port.

12 Claims, 5 Drawing Sheets

DYNAMIC OPTICAL CIRCULATOR DEVICE

FIELD OF THE INVENTION

The present invention generally relates to an optical circulator device, and more specifically to a dynamic optical circulator device able to transmit signals through a single optical fiber and to avoid back-reflection loss using a variety of monitoring and adjustment elements with different wavelengths.

BACKGROUND OF THE INVENTION

An optical circulator device is a special fiber-optical element able to separate optical signals traveling in opposite directions in an optical fiber. An optical circulator is a three-port device designed in a manner to ensure light entering any port will exit from the next port. FIG. 1 shows a schematic view of a known passive optical circulator. As shown in FIG. 1, a passive optical circulator 101 has three ports, namely, the first port, the second port and the third port, with each of ports connected to an optical connector 102, 103, 104, respectively. For light entering from optical connector 102 to the first port, the light will exit from the second port to optical connector 103. Similarly, light entering optical connector 103 to the second port will exit from the third port to optical connector 104. With low insertion loss and high isolation between ports, optical circulators are often used to achieve bi-directional transmission over a single fiber in communication systems.

However, the passive optical circulators can only be used with a specific type of optical connector, namely, APC-type connector, to prevent the entering light from back-reflection (BR) at an exit port. When the passive optical circulator is used with UPC-type or PC-type optical connector, severe back-reflection at the optical connector can be detected to render the passive optical circulator relatively ineffective when using with UPC-type or PC-type optical connector, and the application of passive optical circulator is often restricted to APC-type optical connector. However, with the rapid changes and improvement in hardware devices and optical fiber system deployment, the optical-based application systems often includes various connectors, such as, APC-type, UPC-type and PC-type connectors. Therefore, it is imperative to devise an optical circulator device able to be used with UPC-type and PC-type connectors to accommodate the deployment with mixed connector types.

SUMMARY OF THE INVENTION

The primary object of the present invention is to provide a dynamic optical circulator device applicable to different types of connectors. By using optical components in the optical circulator device, the present invention can maintain the low back-reflection characteristics of an optical circulator while capable of working with UPC-type and PC-type connectors as well as APC-type connectors.

To achieve the above object, the present invention is to provide a dynamic optical circulator device, including a first UPC/PC-type optical connector, a second UPC/PC-type optical connector, a third UPC/PC-type optical connector, a passive optical circulator, a reflected light detector and a transform element. The first, second and third UPC/PC-type optical connectors provide connections to optical fibers for receiving and transmitting optical signals. The passive optical circulator includes a first port, a second port and a third port, connected directly or indirectly to the first, the second and the third UPC/PC-type optical connector respectively.

An exemplary embodiment of the dynamic optical circulator device of the present invention shows that the first UPC/PC-type optical connector and the third UPC/PC-type optical connector are connected directly to the first and the third ports of the passive optical circulator, respectively, while the second UPC/PC-type optical connector is connected to the reflected light detector, the transform element and then to the second port of the passive optical circulator. A first optical signal enters the first UPC/PC-type optical connector, travels through the passive optical circulator, the transform element, the reflected light detector, and then exits from the second UPC/PC-type optical connector. In the optical path, the reflected light detector detects the first optical signal at the second port of the passive optical circulator, while no first optical signal is detected at third port of the passive optical circulator. Similarly, a first light optical enters the second UPC/PC-type optical connector, travels through the reflected light detector, the transform element, the passive optical circulator, and then exits from the third UPC/PC-type optical connector. The reflected light detector detects the first optical signal at the third port of the passive optical circulator, while no first optical signal is detected at the first port of the passive optical circulator. In this manner, the dynamic optical circulator device of the present invention achieves the function of an optical circulator and is compatible with UPC-type and PC-type optical connectors as well as APC-type optical connector.

Another exemplary embodiment of the dynamic optical circulator device of the present invention shows that the third UPC/PC-type optical connector is connected directly to the third port of the passive optical circulator, while the first UPC/PC-type optical connector is connected through the transform element and then to first port of the passive optical circulator, and the second UPC/PC-type optical connector is connected through the reflected light detector and then to the second port of the passive optical circulator. A first optical signal enters the first UPC/PC-type optical connector, travels through the transform element, the passive optical circulator, the reflected light detector, and then exits from the second UPC/PC-type optical connector. The reflected light detector detects the first optical signal at the second port of the passive optical circulator, while no first optical signal is detected at third port of the passive optical circulator. Similarly, a first light optical enters the second UPC/PC-type optical connector, travels through the reflected light detector, the passive optical circulator, and then exits from the third UPC/PC-type optical connector. The reflected light detector detects the first optical signal at third of the passive optical circulator, while no first optical signal is detected at the first of the passive optical circulator. In this manner, the dynamic optical circulator device of the present invention achieves the function of an optical circulator and is compatible with UPC-type and PC-type optical connectors as well as APC-type optical connector.

Yet another exemplary embodiment of the dynamic optical circulator device of the present invention shows that the first UPC/PC-type optical connector is connected directly to the first port of the passive optical circulator, while the second UPC/PC-type optical connector is connected through the reflected light detector and then to the second port of the passive optical circulator, and the third UPC/PC-type optical connector through the transform element and then to the third port of the passive optical circulator. A first optical signal enters the first UPC/PC-type optical connector, travels through the passive optical circulator, the reflected light detector, and then exits from the second UPC/PC-type optical connector. The reflected light detector detects the first optical signal at second port of the passive optical circulator, while no first optical signal is detected at third port of the passive optical circulator. Similarly, a first light optical enters the second UPC/PC-type optical connector, travels through the reflected light detector, the passive optical circulator, the transform element, and then exits from the third UPC/PC-type optical connector. The reflected light detector detects the first optical signal at third port of the passive optical circulator, while no first optical signal is detected at the first port of the passive optical circulator. In this manner, the dynamic optical circulator device of the present invention achieves the function of an optical circulator and is compatible with UPC-type and PC-type optical connectors as well as APC-type optical connector.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
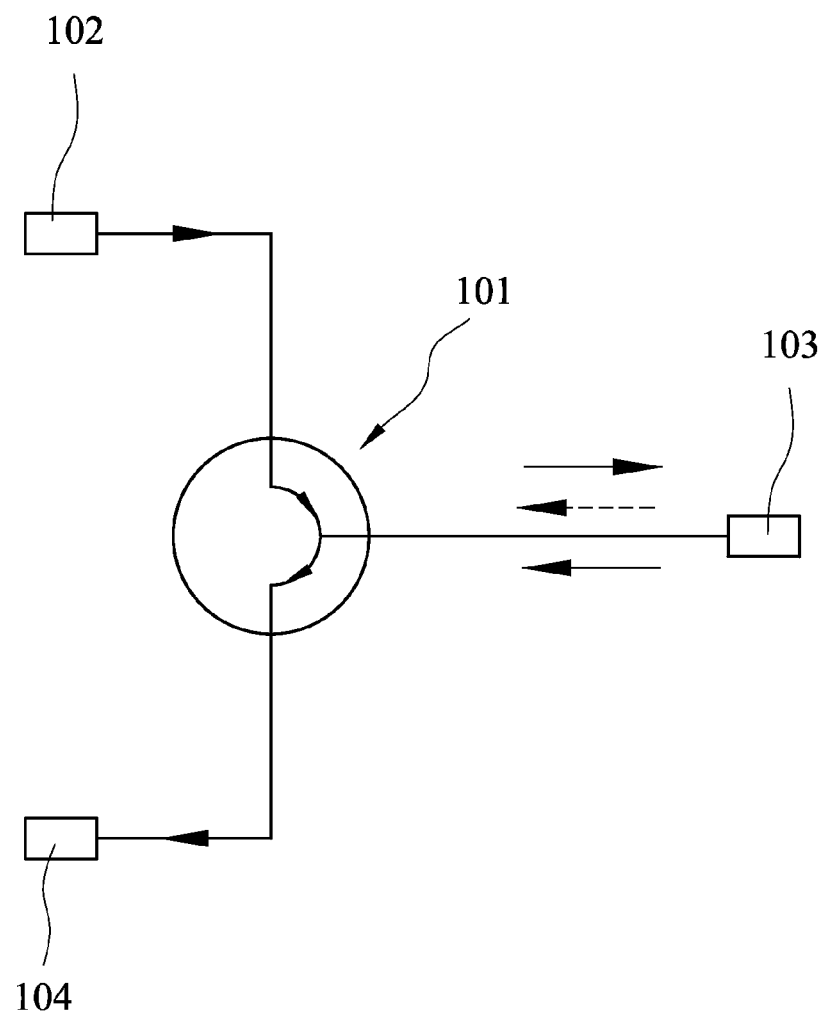
FIG. 1 shows a schematic view of a known passive optical circulator.
Figure 2:
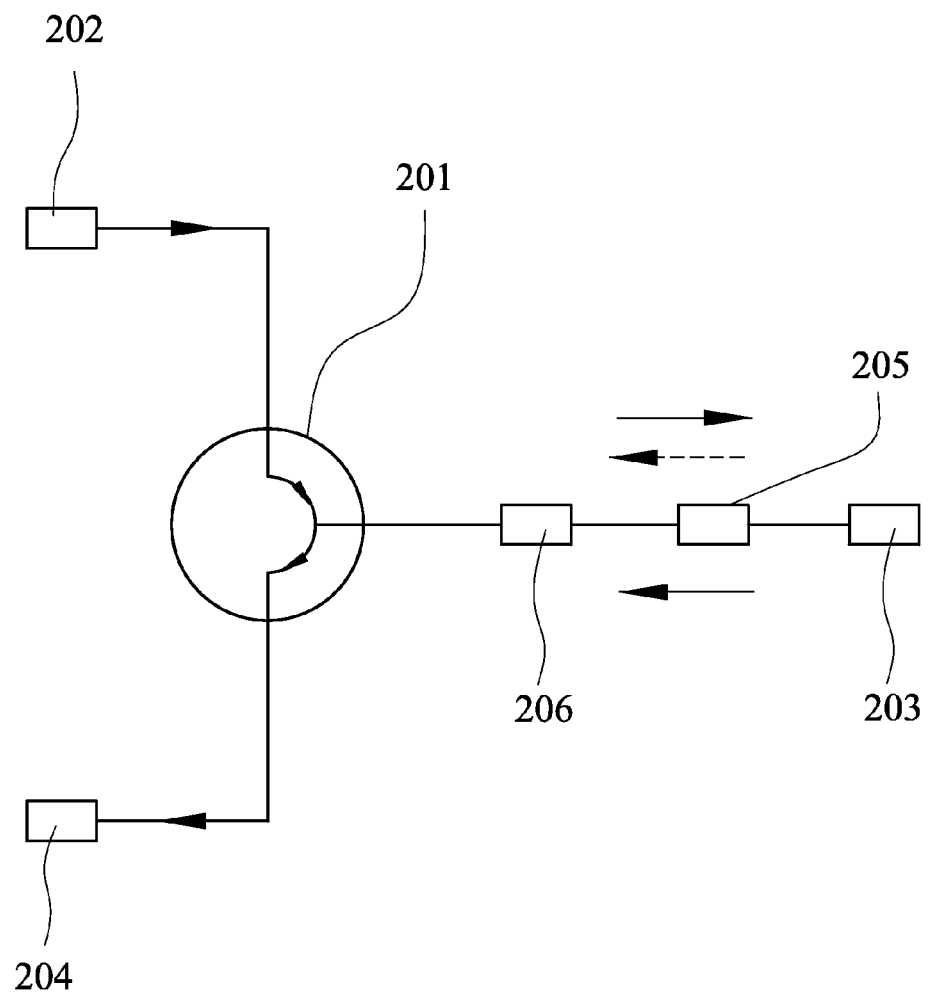
FIG. 2 shows a schematic view of an exemplary embodiment of a dynamic optical circulator device according to the invention.

FIG. 2 shows a schematic view of an exemplary embodiment of a dynamic optical circulator device according to the invention. As shown in FIG. 2, a dynamic optical circulator includes a passive optical circulator 201, a first UPC/PC-type optical connector 202, a second UPC/PC-type optical connector 203, a third UPC/PC-type optical connector 204, a reflected light detector 205 and a transform element 206, wherein passive optical circulator includes a first port, a second port and a third port. As shown in FIG. 2, first UPC/PC-type optical connector 202 is connected to the first of passive optical circulator 201; third UPC/PC-type optical connector 204 is connected to the third of passive optical circulator 201; and second UPC/PC-type optical connector 203 is connected to reflected light detector 205, reflected light detector 205 is then connected to transform element 206, and transform element 206 is connected to the second of passive optical circulator 201. In other words, reflected light detector 205 and connected to transform element 206 are placed between second UPC/PC-type optical connector and the second port of passive optical circulator 201. With the above connection, the optical path of the dynamic optical circulator device can be described as follows: a first optical signal enters first UPC/PC-type optical connector 202 to the first port of passive optical circulator 201, travels through passive optical circulator 201, exits from the second port of passive optical circulator 201, passes transform element 206 and reflected light detector 205, and finally exits from second UPC/PC-type optical connector 203. In this optical path, reflected light detector 205 detects the first optical signal at the second port of passive optical circulator 201, while no first optical signal is detected at the third of passive optical circulator 201. Another possible optical path includes the following: a first light optical enters second UPC/PC-type optical connector 203, passes reflected light detector 205 and transform element 206, enters the second port of passive optical circulator 201, travels through passive optical circulator 201, exits from the third of passive optical circulator 201, and finally exits from third UPC/PC-type optical connector 204. Reflected light detector 205 detects the first optical signal at the third of passive optical circulator 201, while no first optical signal is detected at the first port of passive optical circulator 201. The solid arrows in FIG. 2 indicate the optical path. In this manner, the dynamic optical circulator device of the present invention achieves the function of an optical circulator and is compatible with UPC-type and PC-type optical connectors as well as APC-type connector.

As shown in FIG. 2, additional dash-line arrows mark the optical path between the second port of passive optical circulator 201 and the second UPC/PC-type optical connector. The dash-line arrow indicated the back-reflected optical signal back-reflected due to fiber splicing point sitting on the optical path. Reflected light detector 205 is able to detect such back-reflected optical signals, and transform element 206 is to perform transformation to reduce the amount of back-reflected optical signal so that the ratio between the signal (i.e., optical signal from the first port to the second port, and from the second port to the third port) and the noise (i.e., the back-reflected optical signal from the second port to the first port, and the third port to the second port) is sufficiently high to function as an optical circulator.

Figure 3:
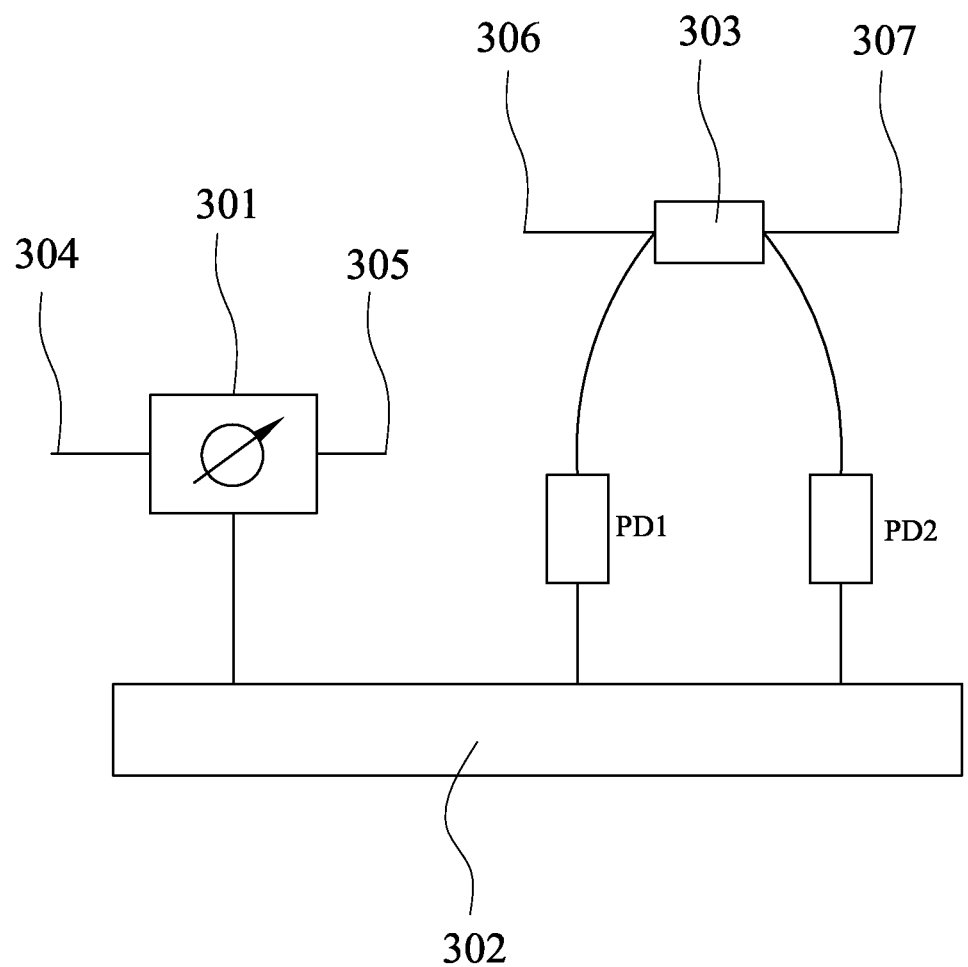
FIG. 3 shows a schematic view of an exemplary embodiment of reflected light detector and transform element according to the present invention.

It is worth noting that reflected light detector 205 and transform element 206 are the components to enable the compatibility between the present invention and the UPC-type and PC-type optical connectors. FIG. 3 shows a schematic view of an exemplary embodiment of reflected light detector and transform element according to the present invention. As shown in FIG. 3, reflected light detector 25 can be embodied with two photodiodes PD1 and PD2, respectively. Photodiode PD1 and PD2 are placed on the optical path between the second port of passive optical circulator 201 and second UPC/PC-type optical connector 203 for detecting light traveling along the optical path in the opposite direction. Transform element 206 can be embodied with a variable optical attenuator (VOA) 301, a device able to adjust the optical signal power passing through. An additional control circuit 302 is connected to both photodiodes PD1, PD2 and VOA 301 for receiving detection signal from photodiodes PD1, PD2 and sending control signal to VOA 301 for adjusting the optical signal passing through. It is worth nothing that while the above description lists control circuit 302 as a separate circuit from photodiodes PD1, PD2 and VOA 301, photodiodes PD1, PD2, VOA 301, and control circuit 302 can all be embodied in a single chip having pins connected to the aforementioned designated optical path. Furthermore, the present embodiment of reflected light detector and transform element is only for illustrative, instead of restrictive, purpose. Any equivalent implementation can be considered within the scope of the present invention.

Figure 4:
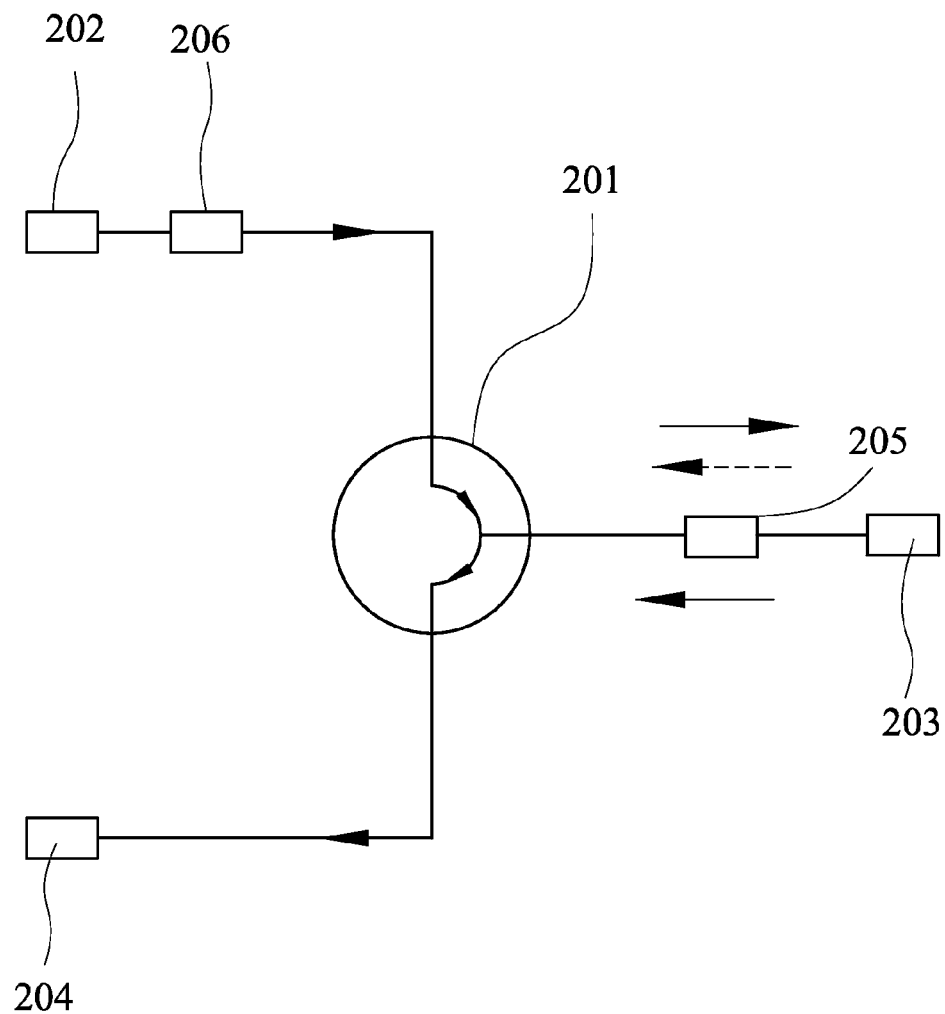
FIG. 4 shows a schematic view of a second exemplary embodiment of a dynamic optical circulator device according to the invention.

FIG. 4 shows a schematic view of a second exemplary embodiment of a dynamic optical circulator device according to the invention. The embodiment of FIG. 4 is similar to the embodiment of FIG. 2, except the placement of transform element 206. In the second embodiment, transform element 206 is placed between the first port of passive optical circulator 201 and first UPC/PC-type optical connector 202. With this connection, the optical path of the dynamic optical circulator device can be described as follows: a first optical signal enters first UPC/PC-type optical connector 202, passes transform element 206 to the first port of passive optical circulator 201, travels through passive optical circulator 201, exits from the second of passive optical circulator 201, passes reflected light detector 205, and finally exits from second UPC/PC-type optical connector 203. In this optical path, reflected light detector 205 detects the first optical signal at the second port of passive optical circulator 201, while no first optical signal is detected at the third port of passive optical circulator 201. Another possible optical path includes the following: a first light optical enters second UPC/PC-type optical connector 203, passes reflected light detector 205, enters the second of passive optical circulator 201, travels through passive optical circulator 201, exits from the third of passive optical circulator 201, and finally exits from third UPC/PC-type optical connector 204. Reflected light detector 205 detects the first optical signal at the third port of passive optical circulator 201, while no first optical signal is detected at the first port of passive optical circulator 201.

Figure 5:
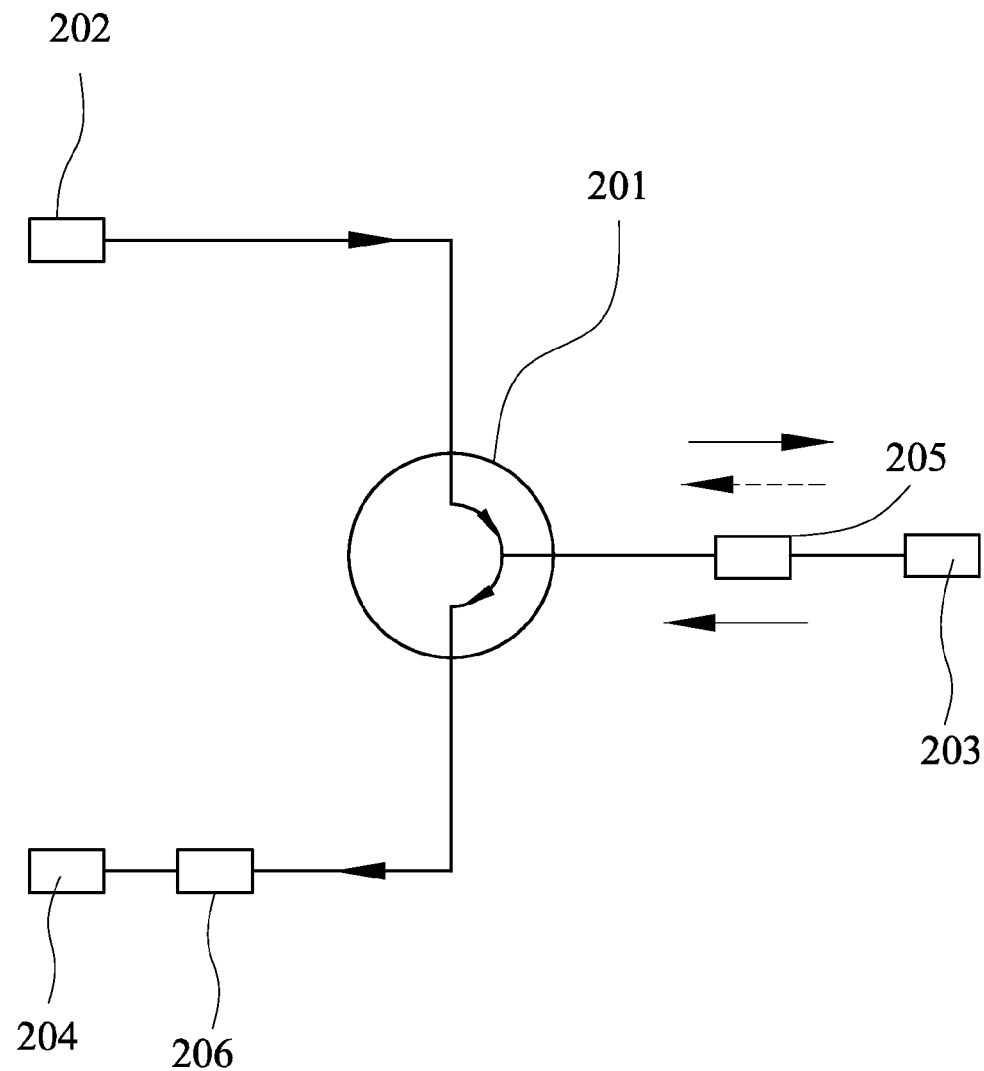
FIG. 5 shows a schematic view of a third exemplary embodiment of a dynamic optical circulator device according to the invention.

FIG. 5 shows a schematic view of a third exemplary embodiment of a dynamic optical circulator device according to the invention. The embodiment of FIG. 5 is similar to the embodiments of FIG. 2 and FIG. 4, except the placement of transform element 206. In the third embodiment, transform element 206 is placed between the third of passive optical circulator 201 and third UPC/PC-type optical connector 204. The detailed description of the optical path is omitted here because of the similarity to the first and the second embodiments. It is worth noting that the embodiments in FIG. 2, FIG. 4 and FIG. 5 show that reflected light detector 205 must be always placed on the optical path between the second port of the passive optical circulator and the second UPC/PC-type optical connector, while transform element 206 can also be placed between the first port of the passive optical circulator and the first UPC/PC-type optical connector, or alternatively, placed between the third port of the passive optical circulator and the third UPC/PC-type optical connector.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A dynamic optical circulator device, comprising:
a passive optical circulator, having a first port, a second port and a third port;
a first UPC/PC-type optical connector, connected to said first port of said passive optical circulator;
a second UPC/PC-type optical connector;
a third UPC/PC-type optical connector, connected to said third port of said passive optical circulator;
a reflected light detector, for detecting back-reflected light, connected to said second UPC/PC-type optical connector; and
a transform element, for processing passing optical signal passing, connected to said second port of said passive optical circulator and said second UPC/PC-type optical connector;
wherein said first UPC/PC-type optical connector, said second UPC/PC-type optical connector, said third UPC/PC-type optical connector for connecting to optical fibers.

2. The dynamic optical circulator device as claimed in claim 1, wherein said reflected light detector further comprises two photodiodes arranged to detect optical signals passing in two opposite directions.

3. The dynamic optical circulator device as claimed in claim 1, wherein said transform element further comprises a variable optical attenuator.

4. The dynamic optical circulator device as claimed in claim 1, further comprising a control circuit, connected to said reflected light detector for receiving detected signal, and connected to said transform element for transmitting control signal to said transform element.

5. A dynamic optical circulator device, comprising:
a passive optical circulator, having a first port, a second port and a third port;
a first UPC/PC-type optical connector;
a second UPC/PC-type optical connector;
a third UPC/PC-type optical connector, connected to said third port of said passive optical circulator;
a reflected light detector, for detecting reflected light, connected to said second UPC/PC-type optical connector and said second port of said passive optical circulator; and
a transform element, for processing passing optical signal passing, connected to said first port of said passive optical circulator and said first UPC/PC-type optical connector;
wherein said first UPC/PC-type optical connector, said second UPC/PC-type optical connector, said third UPC/PC-type optical connector for connecting to optical fibers.

6. The dynamic optical circulator device as claimed in claim 5, wherein said reflected light detector further comprises two photodiodes arranged to detect optical signals passing in two opposite directions.

7. The dynamic optical circulator device as claimed in claim 5, wherein said transform element further comprises a variable optical attenuator.

8. The dynamic optical circulator device as claimed in claim 5, further comprising a control circuit, connected to said reflected light detector for receiving detected signal, and connected to said transform element for transmitting control signal to said transform element.

9. A dynamic optical circulator device, comprising:
a passive optical circulator, having a first port, a second port and a third port;
a first UPC/PC-type optical connector, connected to said first port of said passive optical circulator;
a second UPC/PC-type optical connector;
a third UPC/PC-type optical connector;
a reflected light detector, for detecting reflected light, connected to said second UPC/PC-type optical connector and said second port of said passive optical circulator; and
a transform element, for processing passing optical signal passing, connected to said third port of said passive optical circulator and said third UPC/PC-type optical connector;

wherein said first UPC/PC-type optical connector, said second UPC/PC-type optical connector, said third UPC/PC-type optical connector for connecting to optical fibers.

10. The dynamic optical circulator device as claimed in claim 9, wherein said reflected light detector further comprises two photodiodes arranged to detect optical signals passing in two opposite directions.

11. The dynamic optical circulator device as claimed in claim 9, wherein said transform element further comprises a variable optical attenuator.

12. The dynamic optical circulator device as claimed in claim 9, further comprising a control circuit, connected to said reflected light detector for receiving detected signal, and connected to said transform element for transmitting control signal to said transform element.

* * * * *